United States Patent
Mayell et al.

(10) Patent No.: US 7,570,500 B2
(45) Date of Patent: *Aug. 4, 2009

(54) METHOD AND APPARATUS TO IMPROVE REGULATION OF A POWER SUPPLY

(75) Inventors: Robert J. Mayell, San Francisco, CA (US); Chan Woong Park, Seoul (KR)

(73) Assignee: Power Integrations, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/047,195

(22) Filed: Mar. 12, 2008

(65) Prior Publication Data

US 2008/0157739 A1    Jul. 3, 2008

Related U.S. Application Data

(63) Continuation of application No. 11/227,830, filed on Sep. 15, 2005, now Pat. No. 7,359,222.

(51) Int. Cl.
    *H02M 1/12*    (2006.01)
(52) U.S. Cl. .................. 363/40; 363/313
(58) Field of Classification Search .......... 363/15, 363/16, 18, 19, 39, 40, 131
    See application file for complete search history.

(56) References Cited

U.S. PATENT DOCUMENTS 4,660,136 A    4/1987    Montorefano
5,305,192 A    4/1994    Bonte et al.
5,499,184 A    3/1996    Squibb
5,841,463 A    11/1998   Debesis et al.
6,069,807 A    5/2000    Boylan et al.
6,370,039 B1   4/2002    Telefus
6,385,059 B1   5/2002    Telefus et al.
6,396,725 B1   5/2002    Jacobs et al.
6,990,000 B1   1/2006    Rodriguez et al.
7,359,222 B2*  4/2008    Mayell et al. .............. 363/40
7,463,497 B2   12/2008   Negrete
2002/0057080 A1 5/2002   Telefus et al.
2003/0048126 A1* 3/2003  Watarai ...................... 327/536

* cited by examiner

*Primary Examiner*—Adolf Berhane
(74) *Attorney, Agent, or Firm*—Blakely Sokoloff Taylor & Zafman LLP

(57) ABSTRACT

Techniques are disclosed to regulate a power supply with a compensation signal generation circuit. One example regulated power supply includes a sense circuit coupled to sense an output voltage of the regulated power supply. The regulated power supply also includes a switching power converter circuit, which includes a switch coupled to be switched in response to a control signal received from the sense circuit to regulate the output voltage of the regulated power supply. The regulated power supply also includes a compensation signal generation circuit coupled to receive a switching signal representative of a switching of the switch in the switching power converter circuit. The compensation signal generation circuit is to generate a compensation signal to approximate a load current to be delivered from an output of the regulated power supply. The compensation signal is to be received by the sense circuit to modify the control signal.

24 Claims, 8 Drawing Sheets

US 7,570,500 B2

METHOD AND APPARATUS TO IMPROVE REGULATION OF A POWER SUPPLY

REFERENCE TO PRIOR APPLICATIONS

This application is a continuation of U.S. application Ser. No. 11/227,830, filed Sep. 15, 2005, now U.S. Pat. No.7,359,222, entitled "Method and Apparatus to Improve Regulation of a Power Supply."

BACKGROUND

1. Technical Field

The present invention relates generally to electronic circuits, and more specifically, the invention relates to integrated circuits in which there is power regulation.

2. Background Information

Most battery operated portable electronic products such as cell phones, personal digital assistants (PDAs), etc. require a low power alternating current (AC) to direct current (DC) charger power supply with a constant voltage and constant current (CV/CC) characteristics for charging batteries. Most of these power supplies are housed in small enclosures to provide a portable and easily stored charger appropriate for the products being charged. The small size of the enclosures used for the chargers places efficiency requirements on the operation of the power supply to ensure the temperature inside the power supply enclosure stays within acceptable limits during operation. Switching power supplies are often employed in these types of applications. Due to the competitive nature of the consumer markets being served, there are also strict cost targets applied to these charger power supplies. As consumers continue to expect smaller and more portable products, there is therefore a strong requirement to introduce low cost means to improve the performance of power supplies for chargers. A charger usually attempts to maintain a regulated voltage at the load. However, there is often a long cable connected between the output of the power supply charger and the load. The impedance of the cable with the load current can cause the voltage at the load to be different from the voltage at the charger. One challenge to designers is to improve the regulation of a voltage at the end of a cable outside the enclosure of the power supply without incurring the expense of traditional remote sensing techniques.

BRIEF DESCRIPTION OF THE DRAWINGS

The present invention is illustrated by way of example and not limitation in the accompanying Figures.

DETAILED DESCRIPTION

Figure 1:
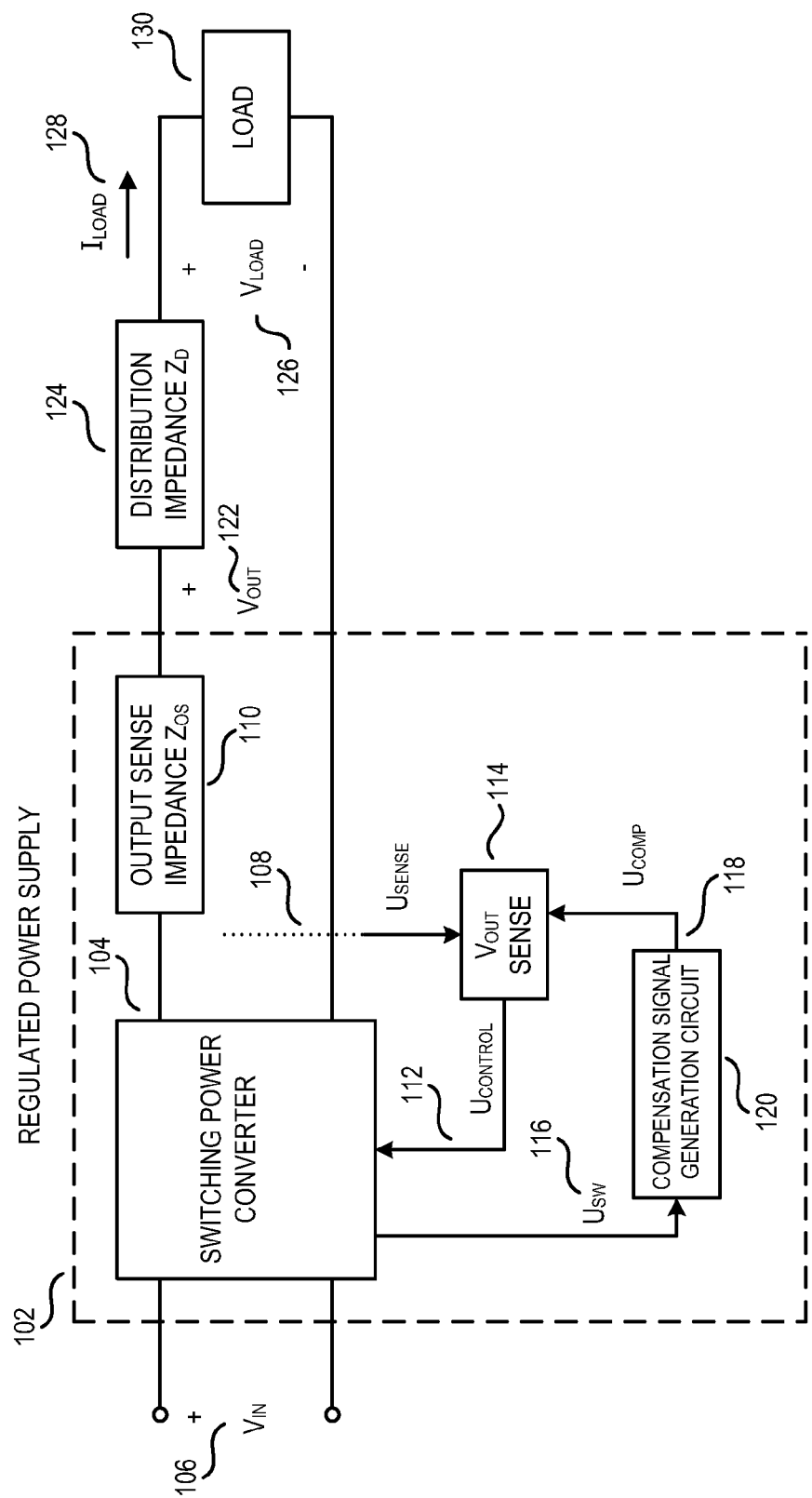
FIG. 1 is a block diagram illustrating one example of a regulated power supply in accordance with the teaching of the present invention.

Embodiments of a regulated power supply are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "for one embodiment" or "in an embodiment" in various places throughout this specification are not necessarily all referring to the same embodiment. Furthermore, the particular features, structures, characteristics, combinations and/or sub-combinations described below and/or shown in the drawings may be combined in any suitable manner in one or more embodiments in accordance with the teachings of the present invention.

As will be discussed, example power supply regulators in accordance with the teachings of the present invention utilize characteristics of a low cost charger while providing a variation in output voltage without direct measurements from the end of the cable at the device to be charged. In one example, a power supply regulator is used as a charger and includes a compensation signal generation circuit, which generates a compensation voltage or current in response to a switching voltage that is present in the charger in accordance with the teachings of the present invention. In the example, the compensation voltage is a function of the magnitude and frequency of the switching voltage. Since the switching frequency of the low cost charger changes with the load current or charging current, the compensation voltage developed by the charge pump is an indirect measure of the charging current through the cable connected to the device to be charged. Thus, the compensation voltage can be used to adjust the regulated output voltage of the charger based on the load current or charging current to keep the voltage at the end of the cable within its specified range in accordance with the teachings of the present invention.

To illustrate, the block diagram of FIG. 1 shows generally a regulated power supply used as a charger coupled to a load through a cable in accordance with the teachings of the invention. As shown, regulated power supply 102 is the charger containing a switching power converter 104 that is coupled to receive an unregulated input voltage $V_{IN}$ 106 and produces a regulated output voltage $V_{OUT}$ 122. As shown, the output of the regulated power supply 102 is sensed by a signal $U_{SENSE}$ 108. Output sense impedance 110 represents a mechanism that causes the output voltage $V_{OUT}$ 122 to differ from output sensing signal $U_{SENSE}$ 108. In one example of regulated power supply 102, output voltage $V_{OUT}$ 122 and output sensing signal $U_{SENSE}$ 108 are separated by rectifiers and by the magnetic coupling of two windings on a transformer. A $V_{OUT}$ SENSE circuit 114 is coupled to receive output sensing signal $U_{SENSE}$ 108 and produces a control signal $U_{CONTROL}$ 112 that governs the switching of the switching power converter 104. In one example, $V_{OUT}$ SENSE circuit 114 includes a resistor divider, and control signal $U_{CONTROL}$ 112 is a current, which changes the switching frequency of the switching power converter 104. As will be discussed, regulated power supply 102 also includes a bias voltage, which is approximately proportional to the output voltage $V_{OUT}$ 122.

As shown in the depicted example, a switching signal $U_{SW}$ 116 is coupled to be received by a compensation signal generation circuit 120. The switching signal $U_{SW}$ 116 is responsive to a switching of a power switch in switching power converter 104. The compensation signal generation circuit 120 produces a compensating signal $U_{COMP}$ 118, which approximates the load current or charging current. In the illustrated example, the compensating signal $U_{COMP}$ 118 is coupled to be received by the $V_{OUT}$ SENSE circuit 114 and is used to adjust the control signal $U_{CONTROL}$ 112 in accordance with the teachings of the present invention. In the example regulated power supply 102, switching signal $U_{SW}$ 116 is a voltage from the bias winding of a transformer, and compensating signal $U_{COMP}$ 118 is a negative voltage that is responsive to the switching frequency of switching power converter 104, the output sensing signal $U_{SENSE}$ 108, and the input voltage $V_{IN}$ 106.

As shown in the illustrated example, a distribution impedance 124 is coupled to receive the output voltage $V_{OUT}$ 122 of regulated power supply 102. In the illustrated example, distribution impedance 124 represents the resistance of a cable that is coupled between the output of regulated power supply 102 and a load 130. Load 130 represents a device to be charged, such as for example a cell phone battery or the like. As shown, a load current 128 or charging current is delivered through the cable or distribution impedance 124 to load 130. In the illustrated example, regulated power supply 102 uses voltage developed by the compensation signal generation circuit 120 to change the output voltage $V_{OUT}$ 122 in response to the charging current 128 so that the voltage $V_{LOAD}$ 126 at the load 130 remains within its specified limits in accordance with the teachings of the present invention.

Figure 2:
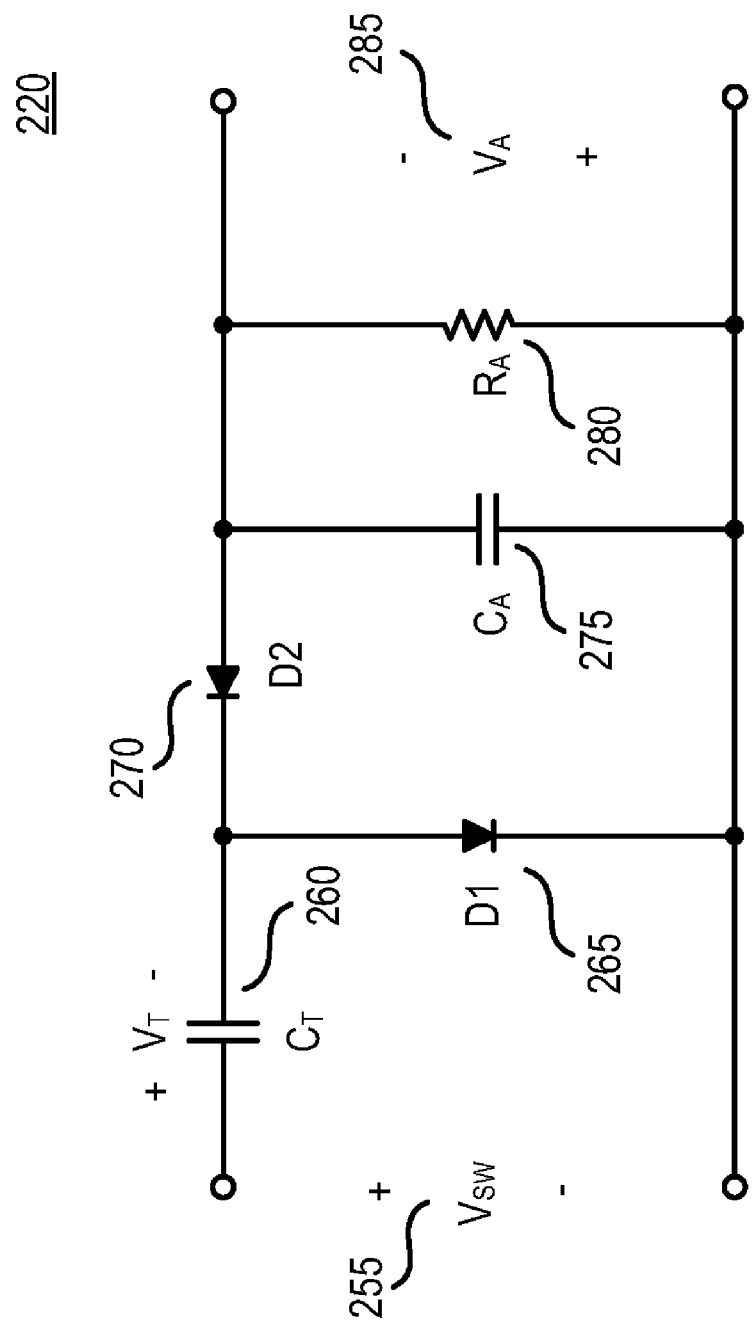
FIG. 2 is a schematic illustrating one example of a compensation signal generation circuit used in a regulated power supply in accordance with the teaching of the present invention.

FIG. 2 is a schematic illustrating one example of a compensation signal generation circuit 220 used in a regulated power supply in accordance with the teaching of the present invention. In one example, compensation signal generation circuit 220 may be used in place of the compensation signal generation circuit 120 of FIG. 1. Referring back to FIG. 2, compensation signal generation circuit 220 is a charge pump circuit that is coupled to receive a switching voltage $V_{SW}$ 255, which generates a DC voltage $V_A$ 285, which in this example is a compensation voltage. As will be discussed, the compensation voltage or DC voltage $V_A$ 285 will be utilized in examples as an approximation of the load current $I_{LOAD}$ or charging current in a regulated power supply in accordance with the teachings of the present invention. Capacitor $C_T$ 260 is coupled to receive switching voltage $V_{SW}$ 255 and charge that is transferred by capacitor $C_T$ 260 is accumulated by capacitor $C_A$ 275 and removed through resistor 280. The magnitude of the switching voltage $V_{SW}$ 255 and the value of capacitor $C_T$ 260 determine the amount of charge. The frequency of variation in the switching voltage $V_{SW}$ 255 determines the rate of transfer of charge, which corresponds to a current that is balanced by the current removed through resistor 280. The DC voltage $V_A$ 285 is the compensation voltage that balances the currents in capacitor $C_A$ 275. Capacitor $C_A$ 275 is large enough to keep the DC voltage $V_A$ 285 approximately constant over a switching period.

Figure 3:
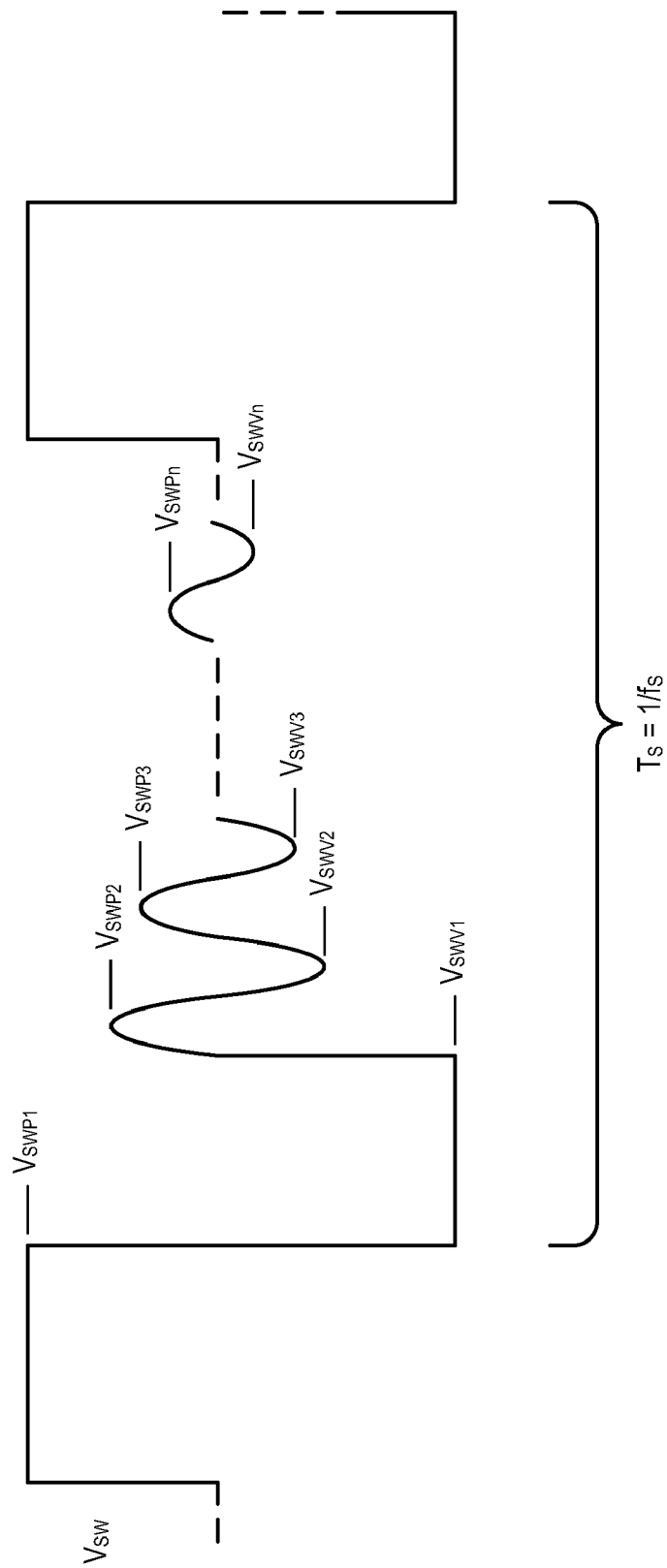
FIG. 3 is a waveform of a switching voltage found in one example of a regulated power supply in accordance with the teaching of the present invention.

FIG. 3 is an illustration of a waveform found in one example of a regulated power supply in accordance with the teaching of the present invention. For instance, in one example, the waveform shown in FIG. 3 may be found in the regulated power supply 102 of FIG. 1. In particular, FIG. 3 shows salient features in one switching period of a typical voltage $V_{SW}$ at the input to the charge pump or compensation signal generation circuit 120 or 220. The peaks and valleys in the voltage determine the accumulated charge. In the example power supply, the first peak $C_{SWP1}$ and first valley $C_{SWV1}$ are set primarily by the input voltage $V_{IN}$ 106 and output sense voltage $U_{SENSE}$ 108, so the values are fairly easy to compute. The other peaks and valleys are difficult to predict analytically because they are strongly influenced by stray capacitance and parasitic losses. To illustrate, for the charge pump circuit or compensation signal generation circuit 220 of FIG. 2, the accumulated charge is given by the expression $$Q_A = C_T \sum_n (V_{SWPn} - V_{SWVn} - V_A) \qquad \text{Equation 1}$$

for $$(V_{SWPn} - V_{SWVn}) > V_A \qquad \text{Equation 2}$$

where the summation includes each of the n sets of peak and valley values, and $$V_A = Q_A R_A f_s \qquad \text{Equation 3}$$

where $f_s$ is the switching frequency.

If the voltage has only one peak and one valley, the accumulated voltage $V_A$ is a linear function of switching frequency. It is noted, however, that ringing oscillation of the voltage waveform can add significantly to $Q_A$ and $V_A$, which adds complexity to the relationship between $V_A$ and the switching frequency because as the switching frequency increases, fewer peaks and valleys contribute to the sum. Nevertheless, plots of measurements of $V_A$ from the example application show a linear relationship at least at lower switching frequencies and lower values of $V_A$. Therefore, referring back to the example regulated power supply of FIG. 1, the load current $I_{LOAD}$ 128 or output current can be approximated by the switching frequency which is linearly related to $V_A$ for at least lower switching frequencies and lower values of $V_A$ in accordance with the teachings of the present invention. In one example, a designer can exploit these complicating effects of the ringing oscillations to change the relationship of the accumulated voltage $V_A$ to the load current in accordance with the teachings of the present invention.

Figure 4:
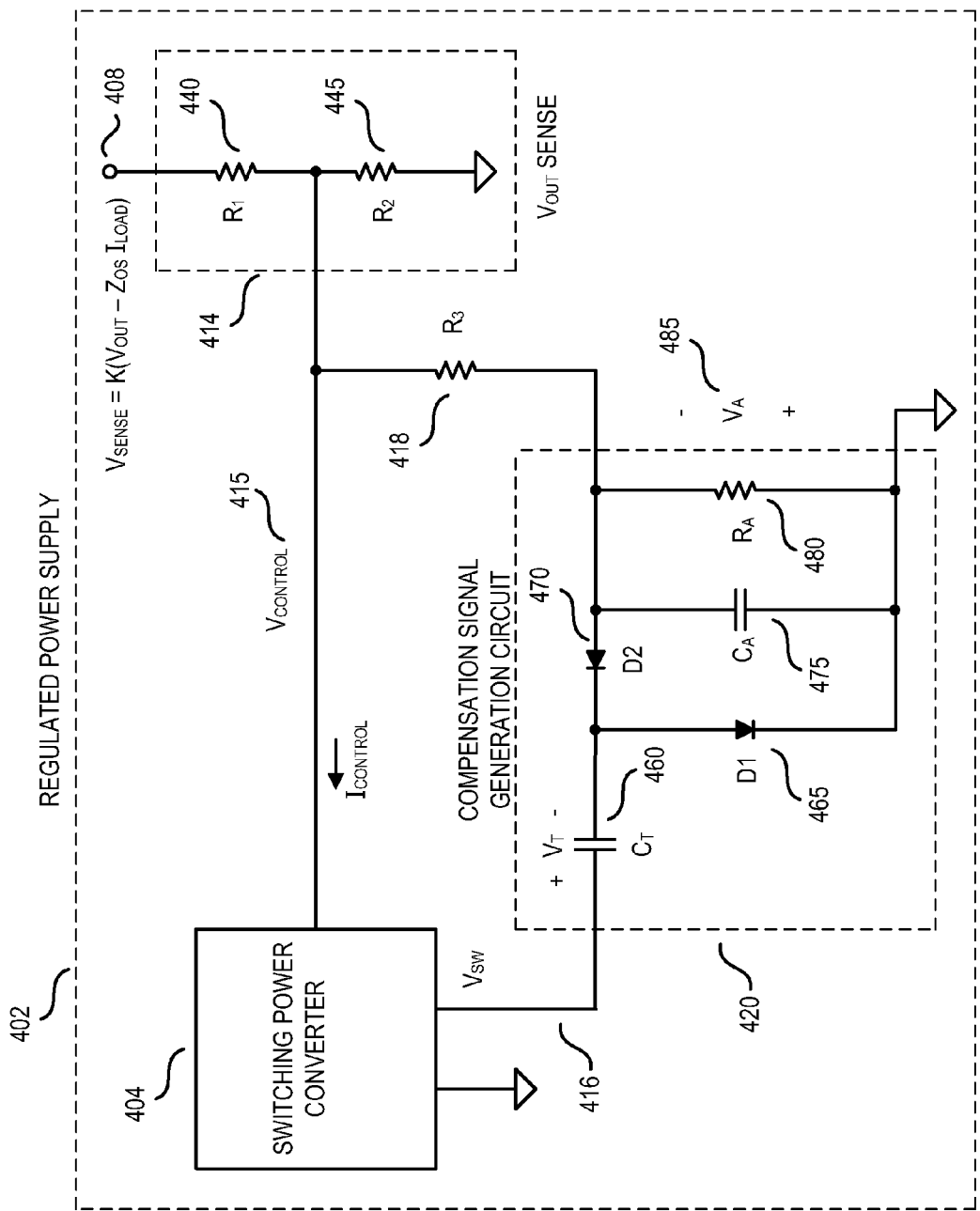
FIG. 4 is a schematic illustrating an example of a regulated power supply with increased detail of a compensation signal generation circuit that modifies the control parameter from the output voltage sense in the example power supply in accordance with the teaching of the present invention.

FIG. 4 is a schematic illustrating one example of a regulated power supply with increased detail of a compensation signal generation circuit that modifies the control parameter from the output voltage sense in the example power supply. In particular, FIG. 4 shows a regulated power supply 402 including a switching power converter 404. A switching signal $V_{SW}$ 416 is generated in response to a switching of a switch in switching power converter 404. Regulated power supply 402 is coupled to receive a control signal 415 at a control terminal of switching power converter 404. In the illustrated example, a sense block 414 is a resistor divider including resistor $R_1$ 440 and resistor $R_2$ 445, with control signal 415 at the node between resistors 440 and 445. Regulated power supply 402 includes a compensation signal generation circuit 420, which is illustrated as a charge pump in the example and is coupled to receive the switching signal $V_{SW}$ 416. It is noted that the regulated power supply 402 and compensation signal generation circuit 420 are examples according to the teachings of the present invention and may be used for example in place of regulated power supply 102 and/or compensation signal generation circuit 120 of FIG. 1.

Referring back to the example illustrated in FIG. 4, a $V_{OUT}$ SENSE circuit 414 is coupled to receive a $V_{SENSE}$ 408 signal, which is a sense of the output voltage $V_{OUT}$ of the regulated power supply 402. A control signal 415, which in the illustrated example is a voltage $V_{CONTROL}$, is influenced by the voltage $V_A$ 485 across resistor $R_A$ 480 of the compensation signal generation circuit 420 through resistor $R_3$ 418. In the example, the output sense voltage $V_{SENSE}$ 408 is a bias voltage that is related to the output voltage by a constant K, after modification by the load current $I_{LOAD}$ with the output sense impedance $Z_{OS}$ according to the relationship $$V_{SENSE} = K(V_{OUT} - Z_{OS} I_{LOAD})$$  Equation 4

As shown, the voltage $V_A$ 485 across resistor $R_A$ 480 from the compensation signal generation circuit 420 is coupled to, and therefore modifies or adjusts the control signal 415 accordingly.

As discussed, the voltage $V_A$ 485 is an approximation of the charging current or load current $I_{LOAD}$ with the linear relationship between charging current and switching frequency for at least lower switching frequencies and lower values of $V_A$ in accordance with the teachings of the present invention. Therefore, the modification of the control signal 415 by the voltage $V_A$ 485 compensates for the influence of the charging current or load current $I_{LOAD}$ conducted through the cable to for example a battery, as discussed for example in FIG. 1. Depending on the type of regulation utilized by switching power converter 404, such as switching frequency, pulse width modulation, on-off control, or the like, the regulation of the output voltage of the regulated power supply 402 is adjusted in response to the charging current or load current $I_{LOAD}$ in accordance with the teachings of the present invention. The compensation is accomplished without a direct measurement of the charging current or load current $I_{LOAD}$ or without direct measurement of the voltage at the end of the cable in accordance with the teachings of the present invention.

In the illustrated example, the switching frequency changes approximately linearly with charging current in the example power supply. The lower switching frequency at lower charging currents reduces the magnitude of the voltage from the charge pump to cause the power supply to regulate at a lower output voltage at lower charging currents, and at higher output voltages at higher charging currents in accordance with the teachings of the present invention.

Figure 5:
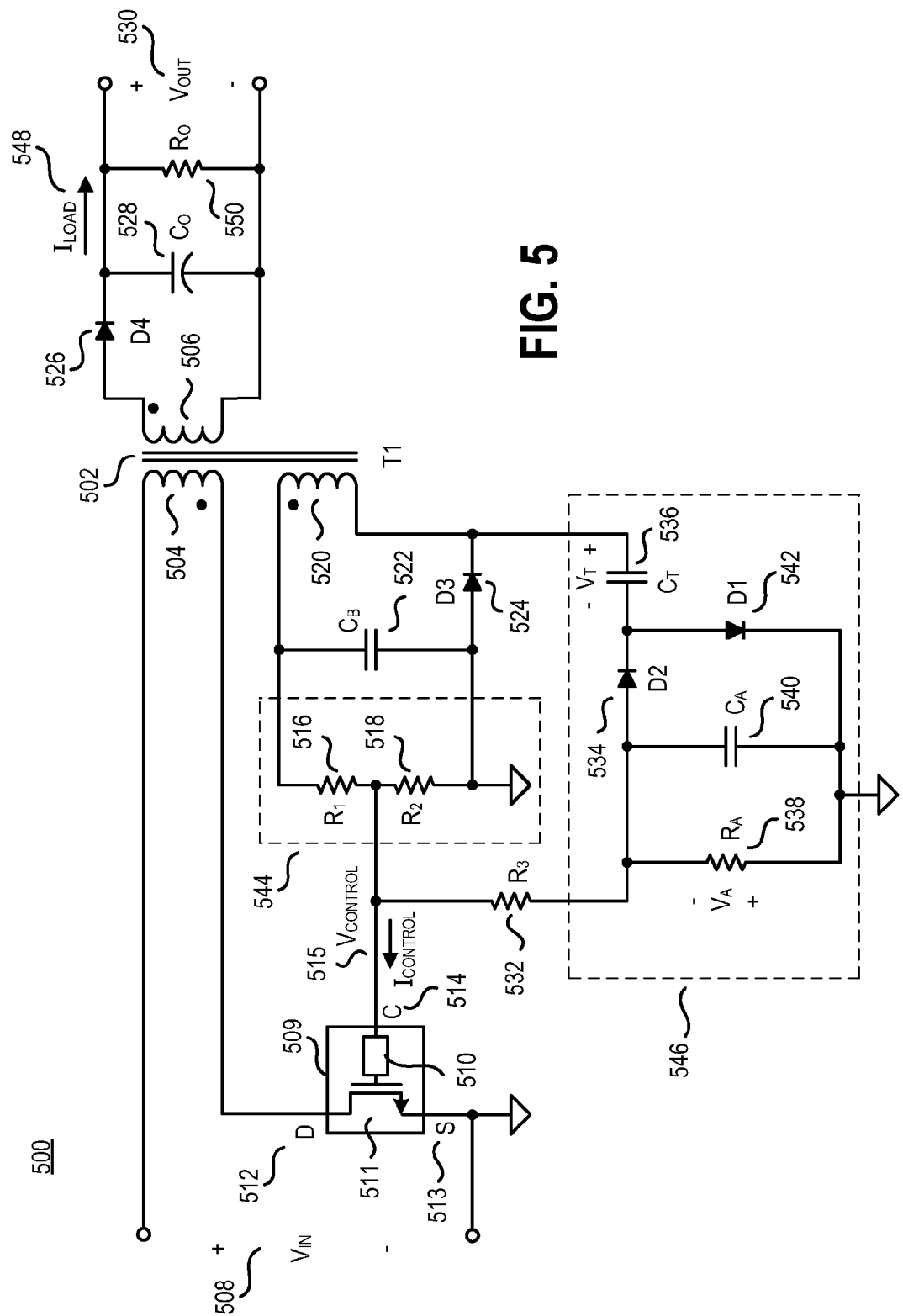
FIG. 5 is another schematic illustrating another example of a regulated power supply including a compensation signal generation circuit in accordance with the teachings of the present invention.

FIG. 5 is a schematic illustrating one example of a regulated power supply 500 including a compensation signal generation circuit 546 in accordance with the teachings of the present invention. As shown, power supply 500 is a switching power supply coupled to receive an unregulated DC input $V_{IN}$ 508 and generates a regulated DC output voltage $V_{OUT}$ 530. A cable such as distribution impedance 124 may be coupled to $V_{OUT}$ 530 to deliver a charging current or load current $I_{LOAD}$ 548 to charge a battery. Regulated power supply 500 includes an energy transfer element 502, which in one example is a transformer including a primary winding 504, a secondary winding 506 and a bias winding 520.

In the illustrated example, a power supply regulator integrated circuit 509 is also included. In one example, power supply regulator integrated circuit 509 includes at least three terminals including a drain terminal D 512, a source terminal S 513 and a control terminal C 514. Drain terminal D 512 is coupled to the primary winding 504 and source terminal S 513 is coupled to one of the input terminals of $V_{IN}$ 508. It is noted that in one example, power supply regulator integrated circuit 509 may be included in switching power converter circuit 104 of FIG. 1 or 404 of FIG. 4 in accordance with the teachings of the present invention.

In one example, power supply regulator integrated circuit 509 includes a switch 511, such as for example a power MOSFET, coupled between the drain terminal D 512 and source terminal S 513. A control circuit 510 is included in power supply regulator integrated circuit 509 and is coupled to the control terminal C 514 to receive a control signal 515. In the illustrated example, bias winding 520 provides a sensing of the output voltage $V_{OUT}$ 530 and provides a switching signal representative of the switching of switch 511 in power supply regulator integrated circuit 509 in accordance with the teachings of the present invention. In operation, control circuit 510 is coupled to control the switching of the switch 511 to regulate the transfer of energy from the primary winding 504 to the secondary winding 506 to the output $V_{OUT}$ 530. In the illustrated example, control circuit 510 regulates the output $V_{OUT}$ 530 in response to the control signal 515. Control circuit 510 may accomplish regulation by changing the switching frequency of switch 511, by using pulse width modulation, by using on-off control or the like.

In the illustrated example, control signal 515 is derived from the bias winding 520, which provides a sense signal through sense circuit 544. In the illustrated example, one polarity of the switching voltage produced by bias winding 520 is approximately proportional to the output voltage $V_{OUT}$ 530 generated from the secondary winding 506. The other polarity of the switching voltage produced by bias winding 520 is approximately proportional to the input voltage $V_{IN}$ that appears at the primary winging 504. As shown, one example of sense circuit 544 includes a resistor divider including resistor $R_1$ 516 and resistor $R_2$ 518. Diode D3 524 and capacitor $C_B$ 522 are coupled to bias winding 520 to rectify and filter the switching voltage provided by bias winding 520. Similarly, diode D4 526 and capacitor $C_o$ 528 are coupled to secondary winding 506 to rectify and filter the output voltage $V_{OUT}$ 530 provided by secondary winding 506.

As shown in FIG. 5, regulated power supply 500 also includes a compensation signal generation circuit 546, which in the illustrated example is a charge pump circuit coupled to receive a switching signal from bias winding 520 and is coupled to deliver a compensation signal to the control terminal C 514 in accordance with the teachings of the present invention. The compensation signal may be a voltage or a current to influence the control signal 515 voltage $V_{CONTROL}$ or current $I_{CONTROL}$ coupled to be received by the control terminal C 514.

In operation, capacitor $C_T$ 536 of compensation signal generation circuit 546 is coupled to receive a switching voltage from bias winding 520. Charge that is transferred by capacitor $C_T$ 536 is accumulated by capacitor $C_A$ 540 and is removed through resistor $R_A$ 538. The magnitude of the switching voltage received from bias winding 520 and the value of capacitor $C_T$ 536 determine the amount of charge. The frequency of variation in the switching voltage from bias winding 520 determines the rate of transfer of charge, which corresponds to a current that is balanced by the current removed through resistor $R_A$ 538. The DC voltage $V_A$ across the resistor $R_A$ 538 is the compensation signal that balances the currents in capacitor $C_A$ 540 and influences the control signal 515, which compensates for a voltage drop across a cable coupled to receive the output $V_{OUT}$ 530 in accordance with the teachings of the present invention. In operation, the DC voltage $V_A$ across the resistor $R_A$ 538 is responsive the switching voltage received from bias winding 520, which is responsive to the switching signal used to switch the switch 511 in the power supply regulator integrated circuit 509 in accordance with the teachings of the present invention.

Therefore, in the illustrated example, compensation signal generator circuit 546 generates a compensation signal with the DC voltage $V_A$ across the resistor $R_A$ 538 in response to or by converting the switching voltage received from bias winding 520. The compensation signal is coupled to the control signal to modify or influence the control signal received by power supply regulator integrated circuit 509. This in turn modifies or influences the regulated output voltage $V_{OUT}$ 530, which can be used to compensate for a cable coupled to the output of regulated power supply 500 to deliver for example a charging current to a battery in accordance with the teachings of the present invention.

Figure 6:
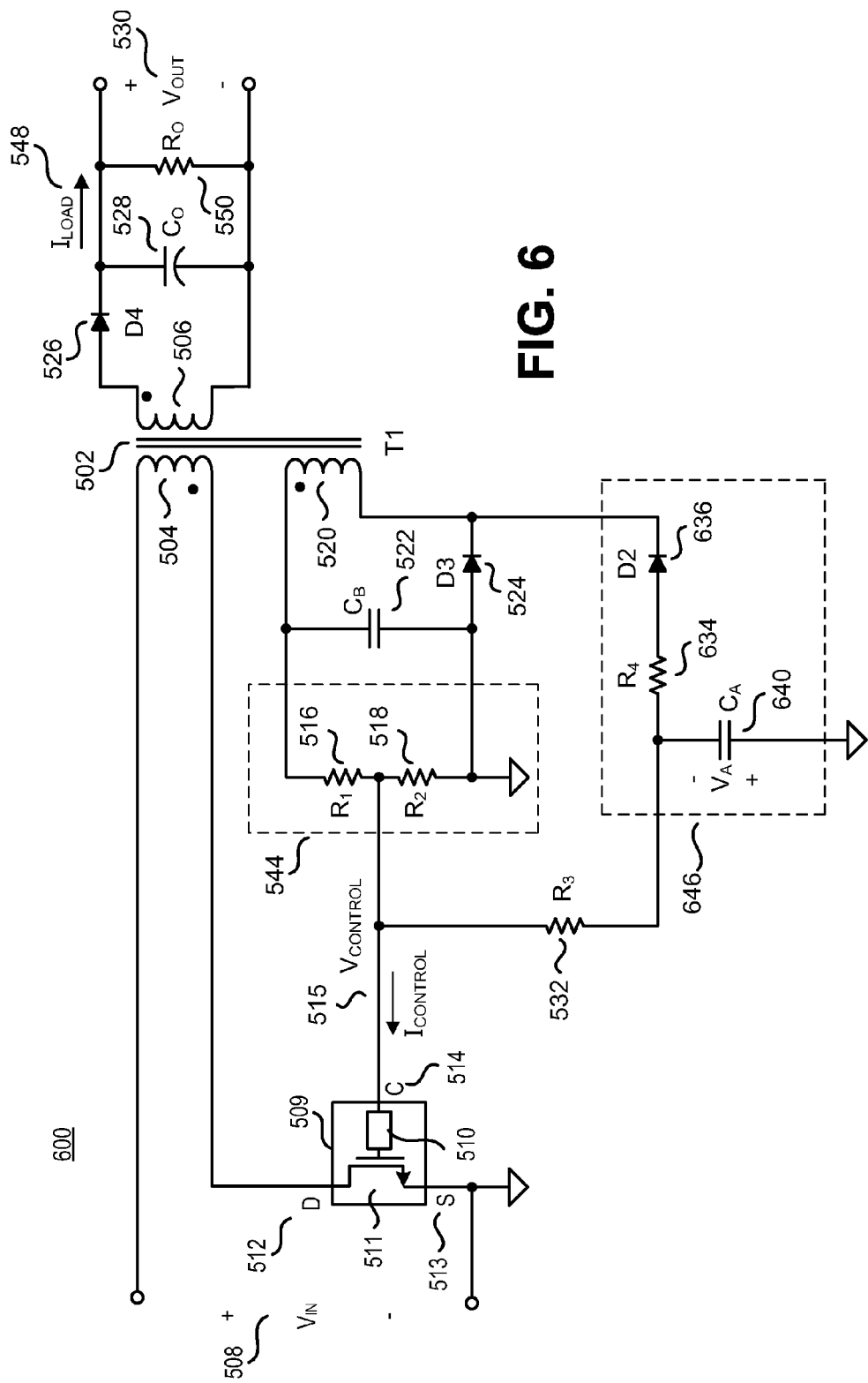
FIG. 6 is yet another schematic illustrating yet another example of a regulated power supply including a compensation signal generation circuit in accordance with the teachings of the present invention.

FIG. 6 is a schematic illustrating another example of a regulated power supply 600 including a compensation signal generation circuit 646 in accordance with the teachings of the present invention. As shown, the example regulated power supply 600 of FIG. 6 shares many similarities with regulated power supply 500 of FIG. 5. One difference between the regulated power supply 600 of FIG. 6 and the regulated power supply 500 of FIG. 5 is that the compensation signal generation circuit 646 of FIG. 6 includes a negative pulse width measurement circuit instead of a charge pump circuit. The negative pulse width measurement circuit includes the low pass filter components of capacitor $C_A$ 640 and $R_4$ 634 with diode D2 636.

In particular, regulated power supply 600 includes a compensation signal generation circuit 646 coupled to receive the switching signal from bias winding 520 and is coupled to deliver a compensation signal to the control terminal C 514 of the power supply regulator integrated circuit 509 in accordance with the teachings of the present invention. The compensation signal may be a voltage or a current to influence the control signal 515 voltage $V_{CONTROL}$ or current $I_{CONTROL}$ coupled to be received by the control terminal C 514.

In operation, the low pass filter including capacitor $C_A$ 640 and resistor $R_4$ 634 is coupled to receive the switching voltage from bias winding 520 through diode D2 636 to form a negative pulse width measurement circuit. In operation, capacitor $C_A$ 640 accumulates charge through resistor $R_3$. Capacitor $C_A$ loses charge through resistor $R_4$ when the voltage from the bias winding 520 goes sufficiently low to forward bias diode D2 636, such as for example the first valley voltage $C_{SWV1}$ in FIG. 3. The voltage on capacitor $C_A$ 640 increases or decreases to balance the average rate of charge accumulation with the average rate of charge loss. In a power converter that controls an output by changing an average switching frequency, the interval between events of lost charge is greater for light loads than for heavy loads. Therefore, more charge is lost on average from capacitor $C_A$ 640 at heavy loads than at light loads, so the magnitude of voltage $V_A$ on capacitor $C_A$ 640 is lower at heavy loads than at light loads. The negative pulse width measurement circuit effectively uses a low pass filter to extract the average of the portion of a switched waveform that is less than a threshold voltage. Accordingly, a DC voltage $V_A$ develops across capacitor $C_A$ 640 from the net charge on capacitor $C_A$ 640. The DC voltage $V_A$ across the capacitor $C_A$ 640 is the compensation signal that is coupled to the control terminal C 514 of power supply regulator integrated circuit 509. Thus, the DC voltage $V_A$ across the capacitor $C_A$ 640 influences the control signal 515, which compensates for a voltage drop across a cable coupled to receive the output $V_{OUT}$ 530 in accordance with the teachings of the present invention. In operation, the DC voltage $V_A$ across the capacitor $C_A$ 640 is responsive to the switching voltage received from bias winding 520, which is responsive to the switching signal used to switch the switch 511 in the power supply regulator integrated circuit 509 in accordance with the teachings of the present invention.

Figure 7:
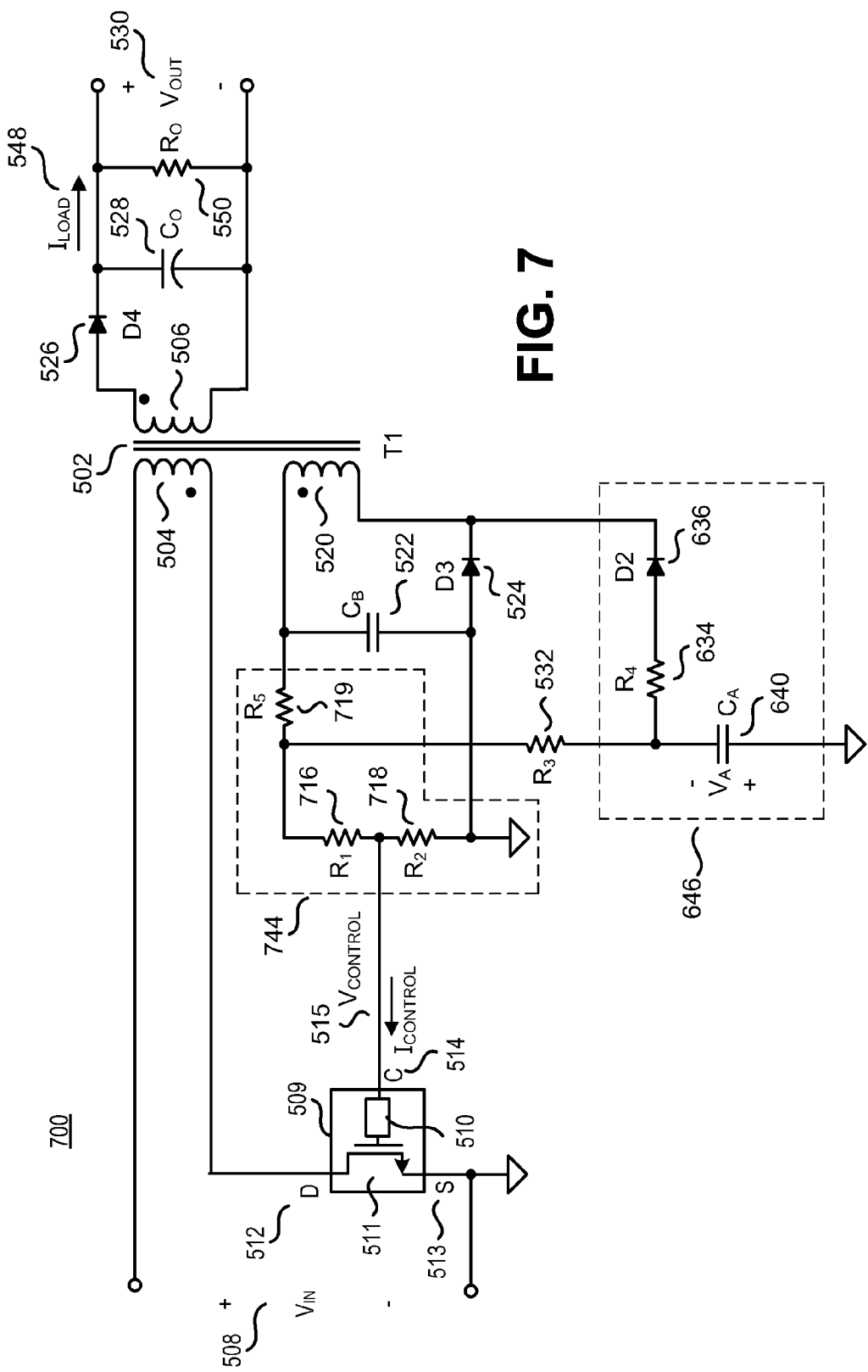
FIG. 7 is yet another schematic illustrating still another example of a regulated power supply including a compensation signal generation circuit in accordance with the teachings of the present invention.

FIG. 7 is a schematic illustrating yet another example of a regulated power supply 700 including the compensation signal generation circuit 646 in accordance with the teachings of the present invention. As shown, the example regulated power supply 700 of FIG. 7 shares many similarities with regulated power supply 600 of FIG. 6. One difference between the regulated power supply 700 of FIG. 7 and the regulated power supply 600 of FIG. 6 is that the compensation signal from the compensation signal generation circuit 646 is coupled to be received at a different location in the schematic. The alternative location is helpful when leakage inductance of energy transfer element 502 causes a shift in the voltage on bias winding 520 that reduces the conduction time of diode D2 636. Under such conditions, a voltage greater than the control voltage $V_{CONTROL}$ may be needed to accumulate enough charge on capacitor $C_A$ 640 for desired operation.

In particular, regulated power supply 700 includes sense circuit 744, which includes a divider circuit including resistor $R_5$ 719 coupled to resistor $R_1$ 716 coupled to resistor $R_2$ 718. The resistor divider of sense circuit 744 is coupled to sense the bias winding 520. As shown, the control signal coupled to be received by the control terminal C 514 of the power supply regulation integrated circuit 509 is generated at the node between $R_1$ 716 and resistor $R_2$ 718 of the resistor divider. As shown in the illustrated example, the compensation signal generated by the compensation signal generation circuit 646 is coupled to be received by the sense circuit 744 at the node between $R_5$ 719 and resistor $R_1$ 716 of the resistor divider. The switching signal from bias winding 520 is coupled to deliver a compensation signal to the control terminal C 514 of the power supply regulator integrated circuit 509 in accordance with the teachings of the present invention. The compensation signal may be a voltage or a current to influence the sense circuit 744, which thereby includes the control signal 515 voltage $V_{CONTROL}$ or current $I_{CONTROL}$ coupled to be received by the control terminal C 514 in accordance with the teachings of the present invention.

In operation, the DC voltage $V_A$ across the capacitor $C_A$ 640 is the compensation signal that is coupled to the sense circuit 744. The circuit of FIG. 7 shows that capacitor $C_A$ 640 accumulates charge from the higher voltage node between R5 719 and R1 716 to allow capacitor $C_A$ 640 to lose charge during the desired conduction time of diode D2 636. Thus, the DC voltage $V_A$ across the capacitor $C_A$ 640 influences the control signal 515, which compensates for a voltage drop across a cable coupled to receive the output $V_{OUT}$ 530 in accordance with the teachings of the present invention. In operation, the DC voltage $V_A$ across the capacitor $C_A$ 640 is responsive the switching voltage received from bias winding 520, which is responsive to the switching signal used to switch the switch 511 in the power supply regulator integrated circuit 509 in accordance with the teachings of the present invention.

Figure 8:
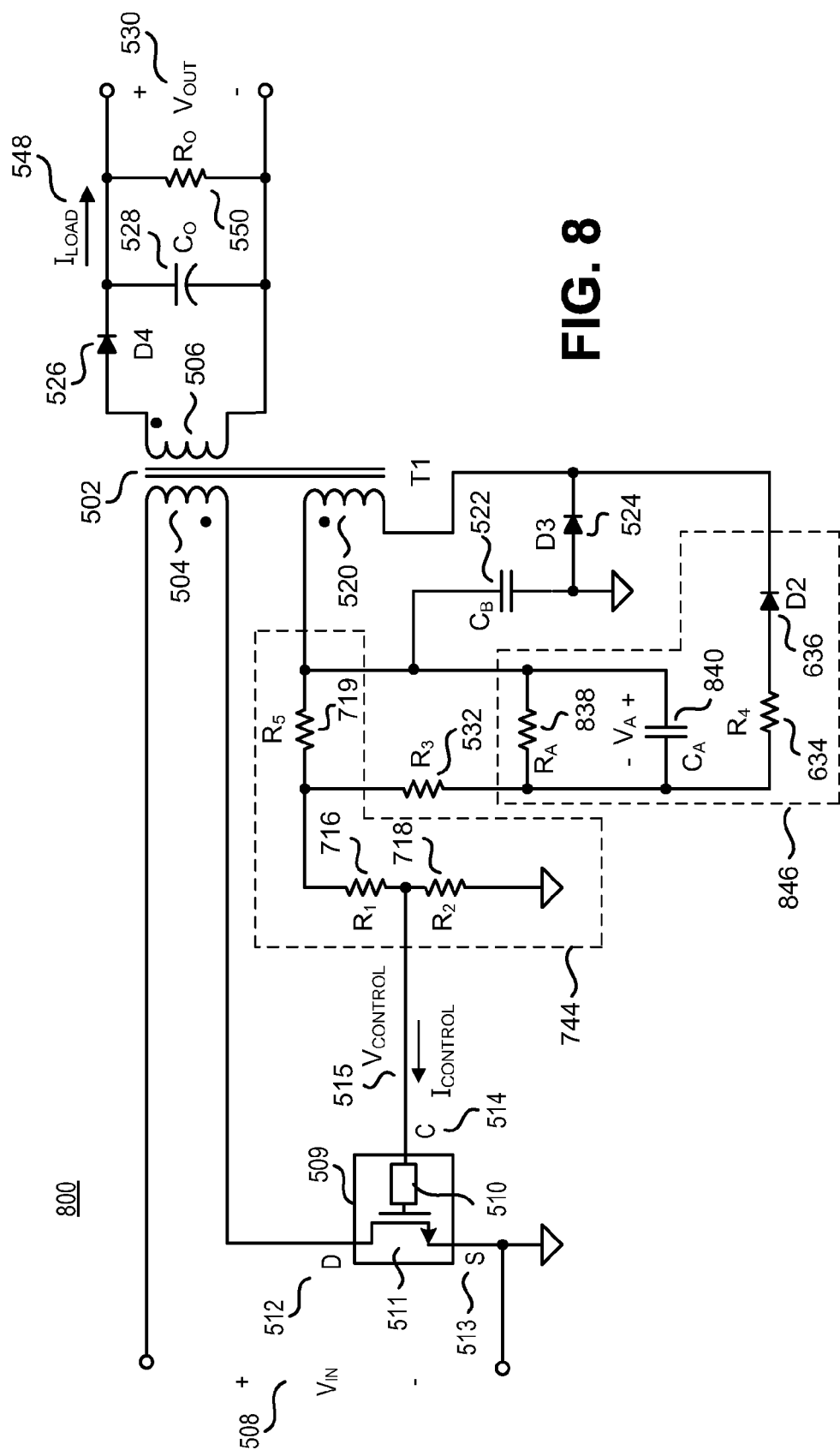
FIG. 8 is yet another schematic illustrating still another example of a regulated power supply including a compensation signal generation circuit in accordance with the teachings of the present invention.

FIG. 8 is a schematic illustrating yet another example of a regulated power supply 800 including a sense circuit 744 and compensation signal generation circuit 846 in accordance with the teachings of the present invention. As shown, the example regulated power supply 800 of FIG. 8 shares many similarities with regulated power supply 600 of FIG. 6 and regulated power supply 700 of FIG. 7. One difference between the regulated power supply 800 of FIG. 8 and the regulated power supply 700 of FIG. 7 is that the regulated power supply 800 includes a compensation signal generation circuit 848 coupled to sense circuit 744 and bias winding 520 at capacitor $C_B$ 522. As shown in the depicted example, compensation signal generation circuit 846 includes an accumulation capacitor $C_A$ 840 that is coupled to have its voltage $V_A$ referenced to a different location in the schematic. In particular, the alternative location of the accumulation capacitor $C_A$ 840 with the parallel coupled accumulation resistor $R_A$ 838 coupled to sense circuit 744 through resistor $R_3$ 532 across resistor $R_5$ 719 as shown in FIG. 8 reduces the amount of compensation that is applied in response to transient conditions such as power on, power off, and step loading, thereby preventing an undesirable overshoot of the regulated output voltage.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A regulated power supply, comprising:
a sense circuit coupled to sense an output voltage of the regulated power supply;
a switching power converter circuit including a switch coupled to be switched in response to a control signal received from the sense circuit to regulate the output voltage of the regulated power supply; and
a compensation signal generation circuit coupled to receive a switching signal representative of a switching of the switch in the switching power converter circuit, the compensation signal generation circuit to generate a compensation signal to approximate a load current to be delivered from an output of the regulated power supply, the compensation signal to be received by the sense circuit to modify the control signal.

2. The regulated power supply of claim 1 wherein the compensation signal generation circuit comprises a charge pump circuit.

3. The regulated power supply of claim 1 wherein the compensation signal generation circuit comprises a low pass filter circuit.

4. The regulated power supply of claim 1 wherein a switching frequency of the switch is coupled to be modified in response to the compensation signal to regulate the output voltage.

5. The regulated power supply of claim 4 wherein the switching frequency of the switch is coupled to be modified in response to the load current coupled to be received by a load to be coupled to the output of the regulated power supply.

6. The regulated power supply of claim 1 further comprising an energy transfer element including a primary winding coupled to an input of the power supply, a secondary winding coupled to an output of the power supply, and a bias winding coupled to the sense circuit and coupled to the compensation signal generation circuit.

7. A method for regulating a power supply, comprising:
switching a switch coupled to an energy transfer element to transfer energy from an input of the power supply to an output of the power supply;
generating a control signal responsive to an output voltage of the power supply, wherein the switching of the switch is responsive to the control signal;
generating a compensation signal responsive to a switching signal responsive to the switching of the switch; and
adjusting the control signal in response to the compensation signal.

8. The method of claim 7 wherein generating the compensation signal further comprises generating the compensation signal in response to a switching frequency of the switch.

9. The method of claim 7 wherein generating the compensation signal includes filtering the switching signal through a low pass filter.

10. The method of claim 7 wherein generating the compensation signal comprises accumulating charge on a capacitor in response to the switching signal with a charge pump circuit.

11. A power converter to be coupled to a load through a distribution impedance comprising:
a sense circuit coupled to sense an output voltage at an output of the power converter;
a control circuit coupled to switch a switch in response to a control signal generated by the sense circuit to regulate a load voltage across the load to be coupled to the output of the power converter; and
a charge pump circuit coupled to the sense circuit, the charge pump circuit to generate a compensation signal to modify the control signal in response to a switching signal.

12. The power converter of claim 11 wherein the switch is included in the control circuit.

13. The power converter of claim 11 wherein the distribution impedance represents the resistance of a cable that is coupled between the output of the power converter and the load.

14. The power converter of claim 13 wherein the compensation signal is to be generated in response to a load current to be delivered through the cable.

15. The power converter of claim 11 wherein a switching frequency of the switch to be switched is coupled to be modified in response to the compensation signal to regulate the load voltage across the load to be coupled to the output of the power converter.

16. The power converter of claim 15 wherein the switching frequency is to be modified in response to a load current.

17. The power converter of claim 11 wherein the sense circuit is coupled to a primary side of the power converter.

18. The power converter of claim 11 wherein the switching of the switch is modified in response to a switching frequency.

19. The power converter of claim 11 wherein the charge pump circuit is coupled to an output of the sense circuit and generates the compensation signal that modifies the control signal before it is received by the control circuit.

20. A power converter to be coupled to a load through a distribution impedance comprising:
a sense circuit coupled to sense an output voltage of the power converter;
a control circuit coupled to switch a switch in response to a control signal generated by the sense circuit to regulate a load voltage across the load to be coupled to an output of the power converter; and
a low pass filter coupled to the sense circuit, the low pass filter to generate a compensation signal to modify the control signal in response to a switching signal, wherein the switching signal is representative of the switching of the switch.

21. The power converter of claim 20 wherein the compensation signal is generated in response to a pulse width of the switching signal.

22. The power converter of claim 20 wherein the compensation signal is generated in response to a load current delivered through a cable.

23. The power converter of claim 20 wherein a switching frequency of the switch is coupled to be modified in response to the compensation signal to regulate the load voltage across the load to be coupled to the output of the power converter.

24. The power converter of claim 20 wherein the low pass filter is coupled to an output of the sense circuit and generates the compensation signal that modifies the control signal before it is received by the control circuit.

* * * * *